United States Patent
Arefeen

(10) Patent No.: US 12,445,078 B2
(45) Date of Patent: Oct. 14, 2025

(54) MANAGING REGENERATIVE ENERGY OF ROD PUMP SYSTEM WITHOUT DYNAMIC BRAKING RESISTOR

(71) Applicant: Weatherford Technology Holdings, LLC, Houston, TX (US)

(72) Inventor: Mohammed S. Arefeen, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 98 days.

(21) Appl. No.: 18/522,707

(22) Filed: Nov. 29, 2023

(65) Prior Publication Data

US 2025/0175109 A1    May 29, 2025

Related U.S. Application Data

(60) Provisional application No. 63/603,747, filed on Nov. 29, 2023.

(51) Int. Cl.
| | | |
|---|---|---|
| *H02P 27/08* | (2006.01) | |
| *F04B 47/02* | (2006.01) | |
| *H02P 25/032* | (2016.01) | |

(52) U.S. Cl.
CPC ............ *H02P 27/08* (2013.01); *F04B 47/022* (2013.01); *H02P 25/032* (2016.02)

(58) Field of Classification Search
CPC ...... F04B 47/022; H02P 25/032; H02P 27/08; H02P 25/022; H02P 27/02; H02P 27/04;
(Continued)

(56) References Cited

U.S. PATENT DOCUMENTS

| | | |
|---|---|---|
| 9,206,684 B2 | 12/2015 | Parra et al. |
| 9,601,925 B2 | 3/2017 | Stinessen et al. |

(Continued)

FOREIGN PATENT DOCUMENTS

| | | | |
|---|---|---|---|
| CN | 201298820 | 8/2009 | |
| EP | 1484831 A2 * | 12/2004 | .......... H02M 5/4585 |
| JP | 7229409 B1 | 2/2023 | |

OTHER PUBLICATIONS

"Yamada, Yuuichi et al., Motor driving apparatus, Aug. 12, 2004, Clarivate Analytics, 2025, pp. 1-24" (Year: 2004).*

(Continued)

*Primary Examiner* — Antony M Paul
(74) *Attorney, Agent, or Firm* — Cabello Hall Zinda, PLLC

(57) ABSTRACT

A variable-frequency drive includes a rectifier, a filter, an inverter, a capacitor bank, and control circuitry. The rectifier converts AC power from a power source to DC power on a DC bus for filtering by the filter. The inverter converts the DC power to three-phase AC power for output to the electric motor. The capacitor bank has one or more capacitors connected to the DC bus. The capacitor bank can store regenerative power on the DC bus from the inverter and can supply the stored DC power to the DC bus for conversion to the three-phase AC power to drive the electric motor. The control circuitry pre-charges the capacitor bank from the AC power of the power source. The control circuitry monitors one or more parameters of the variable-frequency drive and detects one or more fault conditions associated with the one or more monitored parameters.

23 Claims, 6 Drawing Sheets

(58) Field of Classification Search
CPC ..... H02P 27/06; H02M 5/4585; H02M 1/126; H02M 1/32; H02M 1/36
USPC .................. 166/358; 417/206, 203; 318/376
See application file for complete search history.

(56) References Cited

U.S. PATENT DOCUMENTS

| | | |
|---|---|---|
| 9,617,990 B2 | 4/2017 | Graybill |
| 9,834,406 B2 | 12/2017 | Mezzadri et al. |
| 9,890,776 B2 | 2/2018 | Graybill |
| 10,060,426 B2 | 8/2018 | Graybill |
| 10,072,651 B2 | 9/2018 | Graybill |
| 10,190,580 B2 | 1/2019 | Graybill |
| 10,250,168 B2 | 4/2019 | Lesanko et al. |
| 10,340,755 B1 | 7/2019 | Dreher |
| 10,483,765 B2 | 11/2019 | Pedersen |
| 11,167,953 B2 | 11/2021 | Morigami |
| 11,319,946 B2 | 5/2022 | Graybill |
| 11,365,620 B2 | 6/2022 | Veltman |
| 11,424,709 B2 | 8/2022 | Arefeen |
| 2009/0195074 A1 | 8/2009 | Buiel |
| 2020/0003048 A1 | 1/2020 | Orban |
| 2020/0399997 A1 | 12/2020 | Scott |
| 2021/0050776 A1 | 2/2021 | Ma et al. |
| 2021/0108489 A1 | 4/2021 | Shampine |
| 2021/0270256 A1 | 9/2021 | Lesanko et al. |
| 2023/0121050 A1 | 4/2023 | Marzano et al. |

OTHER PUBLICATIONS

International Search Report and Written Opinion in PCT Appl. PCT/US2024/050158, mailed Jan. 3, 2025, 4-pgs.
Swamy Mahesh: "Energy efficient drive systems", 2017 International Conference Onoptimization of Electrical and Electronic Equipment (OPTIM) & 2017 Intl Aegeanconference On Electrical Machines and Power Electronics (ACEMP), IEEE, May 25, 2017 (May 25, 2017), pp. 15-21.

* cited by examiner

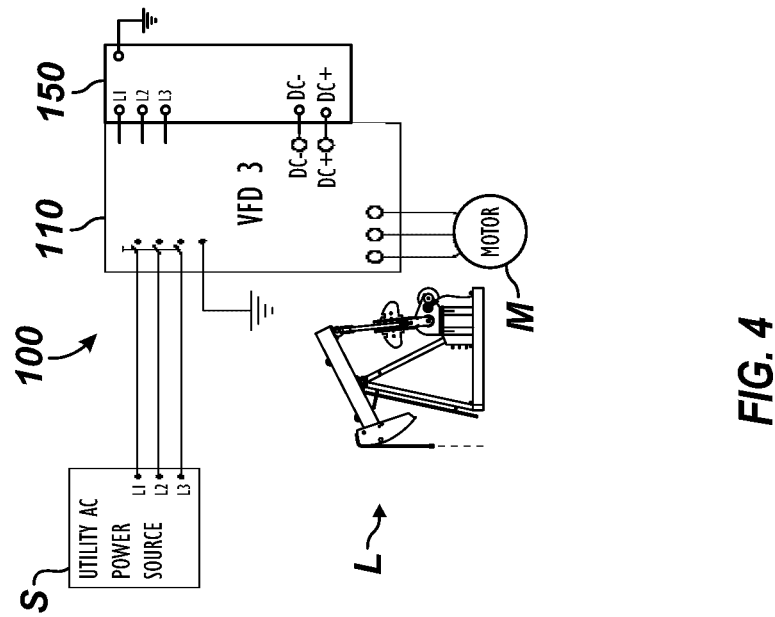
FIG. 4
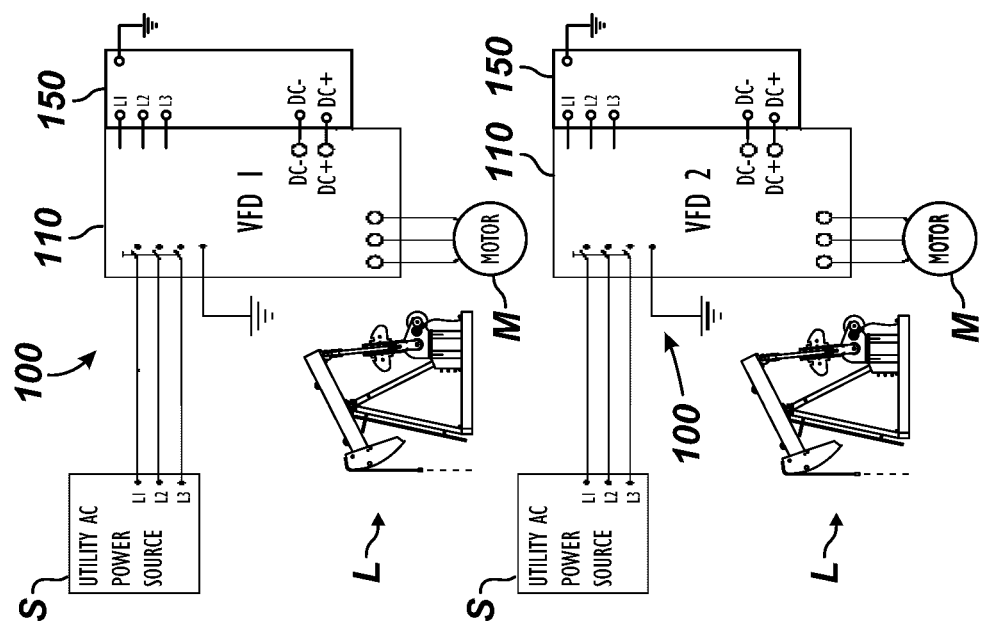

MANAGING REGENERATIVE ENERGY OF ROD PUMP SYSTEM WITHOUT DYNAMIC BRAKING RESISTOR

CROSS-REFERENCE TO RELATED APPLICATIONS

This application claims the benefit of U.S. Provisional Appl. No. 63/603,747, filed Nov. 29, 2023, which is incorporated herein by reference in its entirety.

BACKGROUND OF THE DISCLOSURE

A reciprocating pump unit, such as a sucker rod pump unit, extracts fluid from a well by employing a downhole pump connected to a driving source at the surface. A rod string connects the surface driving force to the downhole pump in the well. When operated, the driving source cyclically raises and lowers the downhole pump, and with each stroke, the downhole pump lifts wellbore fluids toward the surface. A typical surface driving force includes a beam-type pump jack unit, a long-stroke pumping unit, a strap jack unit, and the like, which use an electric motor to drive the unit.

During operation of the reciprocating pump unit, the electric motor can act as a generator, producing regenerative energy. Traditional methods for handling regenerative energy from the electric motor of the reciprocating pump unit can be ineffective and inefficient resulting in lost savings opportunities.

In one solution, a regenerative unit converts the regenerative energy back into the alternating current (AC) power for capture and reuse. The AC regeneration results in a large efficiency loss from the conversion process. In another solution, control of the reciprocating pump unit fluctuates the speed of the reciprocating pump unit during transitions of each stroke. Speeding through transitions of the pump strokes potentially causes inconsistent downhole performance and mechanical failures.

In the most common solution, a dynamic brake resistor can be used to burn off the regenerative energy as heat. As an example, FIG. 1A schematically illustrates a variable-frequency drive 10 having a dynamic braking resistor 60 and being connected between a utility alternating (AC) power source (S) and an electric motor (M) for a reciprocating load, such as a reciprocating pump unit (not shown). The variable-frequency drive 10 uses the dynamic braking resistor 50 to handle regenerative energy produced in the variable-frequency drive 10 during operation of the motor (M) for the reciprocating pump unit.

As shown, the three-phase variable-frequency drive (VFD) 10 includes a direct current (DC) line or bus 12, a rectifier stage 20, a DC bus filter 30, and an inverter stage 40. The variable-frequency drive 10 can also be referred to as a variable speed drive (VSD). The rectifier stage 20 uses diodes 22 and converts three-phase AC input from the AC source (S) to a DC signal for the DC bus 12. The DC bus filter 30 smooths the DC signal on the DC bus 12. The inverter stage 40 has inverters 42 and converts the DC signal into a variable-frequency AC voltage that controls the speed of the electric motor (M).

Overhauling or decelerating loads on the electric motor (M) can make the electric motor (M) turn faster than the synchronous speed set by the variable-frequency drive 10. For example, the electric motor (M) draws/consumes the energy from the utility AC power source (S) during the up-stroke operation of the reciprocating pump unit, whereas the electric motor (M) generates energy during the down-stroke operation of the reciprocating pump unit. When this happens, the electric motor (M) acts as a generator, in which mechanical energy from the electric motor (M) is converted into regenerative energy. This regenerative energy flows back into the variable-frequency drive 10 and increase the voltage of the DC bus 12. To prevent overvoltage of the DC bus 12, the regenerative energy needs to be dissipated or otherwise handled. In this typical implementation, the dynamic braking resistor 50 is used to dissipate the regenerative energy.

As shown, a brake chopper transistor 52 is connected to the DC bus 12. The brake chopper transistor 52 turns the dynamic braking resistor 50 continuously on and off in a duty cycle until the regenerative energy is dissipated as heat. When the voltage of the DC bus 12 exceeds a defined threshold, for example, the brake chopper transistor 52 closes or is "shunted" so current will flow across the large external dynamic brake resistor 50 where the electrical energy is converted to heat. Although using the dynamic brake resistor 50 is the most common approach, this arrangement experiences a short life expectancy and is an environmentally unfriendly waste of electrical energy.

Yet another solution available in the prior art to handle regenerative energy uses an on-site storage system that recycles unused energy from multiple reciprocating pump units. For example, FIG. 1B illustrates an installation of reciprocating pump units (L) having an on-site storage system according to the prior art. Three reciprocating pump units (L) are shown, each having a variable-frequency drive 10 for an electric motor (M). Each of the variable-frequency drives 10 connects to the utility AC power source (S) and powers the connected electric motor (M). The on-site storage system connects to the DC buses of these multiple variable-frequency drives 10 and includes a capacitor-based storage unit 18.

A dynamic braking resistor 50 connects to a DC+ terminal and a brake terminal on each of the variable-frequency drives 10. The DC+ terminal and the DC− terminal for each variable-frequency drive 10 connect via a respective switch 14 to a shared combiner circuit 16. The DC terminals of the combiner circuit 16 connect to the DC terminals of the capacitor-based storage unit 18, which also connects to the utility AC power source (S) via a switch 15.

As the variable-frequency drives 10 operate, any regenerative energy produced by one variable-frequency drive 10 is first shared with the other variable-frequency drives 10 as needed. The variable-frequency drives 10 do not operate synchronously so regenerative energy produced in one variable-frequency drive 10 during a down-stroke operation can be used by another of the variable-frequency drives 10 during its up-stroke operation. Only excess regenerative energy that has not been used by the other variable-frequency drives 10 is stored in the capacitor-based storage unit 18.

Although this arrangement offers specific benefits, each of the variable-frequency drives 10 of the reciprocating pump units (L) still use a dynamic braking resistor 50. The dynamic braking resistors 50 are still needed on the variable-frequency drives 10 because a fault caused in any one of the variable-frequency drives 10 would affect the entire system. To avoid this, the dynamic braking resistor 50 for each given variable-frequency drive 10 can reduce the chances of a fault occurring on the given drive 10 so effects on the entire system of drives 10 can be avoided.

The subject matter of the present disclosure is directed to overcoming, or at least reducing the effects of, one or more of the problems set forth above.

SUMMARY OF THE DISCLOSURE

A variable-frequency drive is used with an alternating current (AC) power source and an electric motor of a reciprocating load device. The variable-frequency drive comprises: an input, an output, a rectifier stage, a direct current (DC) buss filter, and inverter stage, a DC capacitor bank, and control circuitry.

The input is configured to connect to the AC power source, and the output is configured to connect to the electric motor. The rectifier stage is connected to the input and is configured to convert AC power from the AC power source to direct current (DC) power on a DC bus. The DC bus filter is connected between the DC bus and is configured to filter the DC power of the DC bus. The inverter stage is connected to the DC bus and is configured to convert the DC power to three-phase AC power for the output to the electric motor.

The DC capacitor bank has one or more capacitors connected to the DC bus. The DC capacitor bank is configured to store regenerative power on the DC bus from the inverter stage as stored DC power, and the DC capacitor bank is configured to supply the stored DC power to the DC bus for conversion to the three-phase AC power to drive the electric motor. The control circuitry is configured to pre-charge the one or more capacitors of the DC capacitor bank from the AC power of the AC power source. The control circuitry is configured to monitor one or more parameters of the variable-frequency drive and is configured to detect one or more fault conditions associated with the one or more parameters.

The three-phase AC power to drive the electric motor can be drawn from both the DC capacitor bank and from the AC power source. Each of the one or more capacitors of the DC capacitor bank can comprise a nickel oxide hydroxide high amperage capacitor.

The control circuitry can comprise a current sensor being configured measure a current level associated with the DC capacitor bank. The control circuitry can be configured to monitor the current level measured by the current sensor and can be configured to detect a current fault based on the current level as one of the one or more fault conditions.

The control circuitry can comprise a temperature sensor being configured measure a temperature level associated with the DC capacitor bank. The control circuitry can be configured to monitor the temperature level measured by the temperature sensor and can be configured to detect a temperature fault based on the temperature level as one of the one or more fault conditions.

The DC bus can lack a chopper circuit and a dynamic braking resistor.

The control circuitry can comprise a pre-charging circuit being selectively connectable to the AC power of the AC power source. The pre-charging circuit can have diode pairs configured to convert the AC power from the AC power source to the DC power for the DC capacitor bank. For example, the pre-charging circuit can comprise a converter receiving a three-phase line voltage and converting the three-phase line voltage to a single-phase DC voltage that charges the DC capacitor bank. Additionally, the control circuitry can comprise charging contacts and an operating contact. The charging contacts can be selectively connected between the AC power at the input and the pre-charging circuit, and the operating contact can be selectively connected between a positive line of the DC capacitor bank and the DC bus. The control circuitry can be operable in a pre-charging mode to selectively close the charging contacts and open the operating contact and can be operable in an operating mode to selectively open the charging contacts and close the operating contact.

In particular, the pre-charging circuit can connect to the input of the variable-frequency drive having the AC power of the AC power source; and the pre-charging contacts can be configured to selectively connect between (a) an opened state in which the pre-charging circuit is electrically disconnected from the input, and (b) a closed state in which the pre-charging circuit is electrically connected to the input.

In particular, the operating contact can be configured to selectively connect between (a) an opened state in which the DC capacitor bank is electrically disconnected from the DC bus, and (b) a closed state in which the DC capacitor bank is electrically connected to the DC bus.

In conjunction with the pre-charging circuit, charging contacts, and operating contact, the control circuitry can comprise a voltage sensor being configured measure a voltage level associated with the DC capacitor bank. In this case, the control circuitry in the operating mode can be configured to monitor the voltage level measured by the voltage sensor of the DC bus as one of the one or more parameters of the variable-frequency drive. In turn, the control circuitry can be configured to detect a voltage fault based on the voltage level as one of the one or more fault conditions. Additionally, the control circuitry in the pre-charging mode can be configured to monitor the voltage level measured by the voltage sensor of the DC capacitor bank. In turn, the control circuitry can be configured to detect pre-charging of the DC capacitor bank to a predefined voltage threshold.

In conjunction with the pre-charging circuit, charging contacts, and operating contact, the control circuitry can comprise a current sensor being configured measure a current level associated with the DC capacitor bank. In this case, the control circuitry in the operating mode can be configured to monitor the current level measured by the current sensor of the DC bus as one of the one or more parameters of the variable-frequency drive. In turn, the control circuitry can be configured to detect a current fault based on the current level as one of the one or more fault conditions.

In conjunction with the pre-charging circuit, charging contacts, and operating contact, the control circuitry can comprise a temperature sensor being configured measure a temperature level associated with the DC capacitor bank. In this case, the control circuitry in the operating mode can be configured to monitor the temperature level measured by the temperature sensor as one of the one or more parameters of the variable-frequency drive. In turn, the control circuitry can be configured to detect a temperature fault based on the temperature level as one of the one or more fault conditions.

The control circuitry comprises a voltage sensor being configured measure a voltage level associated with the DC capacitor bank; and wherein the control circuitry is configured to monitor the voltage level measured by the voltage sensor and is configured to detect a voltage fault based on the voltage level as one of the one or more fault conditions.

A reciprocating pump unit disclosed herein can be used with an AC power source. The reciprocating pump unit can comprise: an electric motor; and a variable-frequency drive as described above.

A method disclosed herein is used with a variable-frequency drive. The variable-frequency drive is connected to an alternating (AC) power source and is configured to drive an electric motor. The method comprises: pre-charging a direct current (DC) capacitor bank of the variable-frequency drive; and driving the electric motor after pre-charging the DC capacitor bank by: converting, in a rectifier stage, AC power from the AC power source to DC power for a DC bus of the variable-frequency drive; converting, in an inverter stage, the DC power on the DC bus drawn from the rectifier stage and the DC capacitor bank to three-phase AC power for output to the electric motor; and storing, in the DC capacitor bank, regenerative power passed from the electric motor back through the inverter stage to the DC bus.

In the method, pre-charging the DC capacitor bank can comprise: disconnecting the DC capacitor bank from the DC bus of the variable-frequency drive and connecting a pre-charging circuit to the AC power source; converting, with the pre-charging circuit, AC power from the AC power source to the DC power at a target voltage level for the DC capacitor bank; and disconnecting the pre-charging circuit from the AC power source and connecting the DC capacitor bank to the DC bus after pre-charging the DC capacitor bank to the target voltage level.

In the method, storing the regenerative power in the DC capacitor bank can comprise: storing the regenerative power on the DC bus from the inverter stage as stored DC power in the DC capacitor bank; and supplying the stored DC power to the DC bus for conversion to the three-phase AC power to drive the electric motor.

The method can further comprise: monitoring one or more parameters of the variable-frequency drive; and detecting one or more fault conditions associated with the one or more parameters being monitored. In this case, pre-charging the DC capacitor bank of the variable-frequency drive can comprise: measuring one or more of a voltage level, a current level, and a temperature level associated with the DC capacitor bank as the one or more parameters; and detecting, based on the measurement, one or more of a voltage fault, a current fault, and a temperature fault as the one or more fault conditions. Also in this case, driving the electric motor can comprise: measuring one or more of a voltage level, a current level, and a temperature level associated with the DC bus as the one or more parameters; and detecting, based on the measurement, one or more of a voltage fault, a current fault, and a temperature fault as the one or more fault conditions.

The foregoing summary is not intended to summarize each potential configuration or every aspect of the present disclosure.

BRIEF DESCRIPTION OF THE DRAWINGS

FIG. 4 illustrates an installation of reciprocating load devices, each having an integrated apparatus according to the present disclosure.

DETAILED DESCRIPTION OF THE DISCLOSURE

Figure 1A:
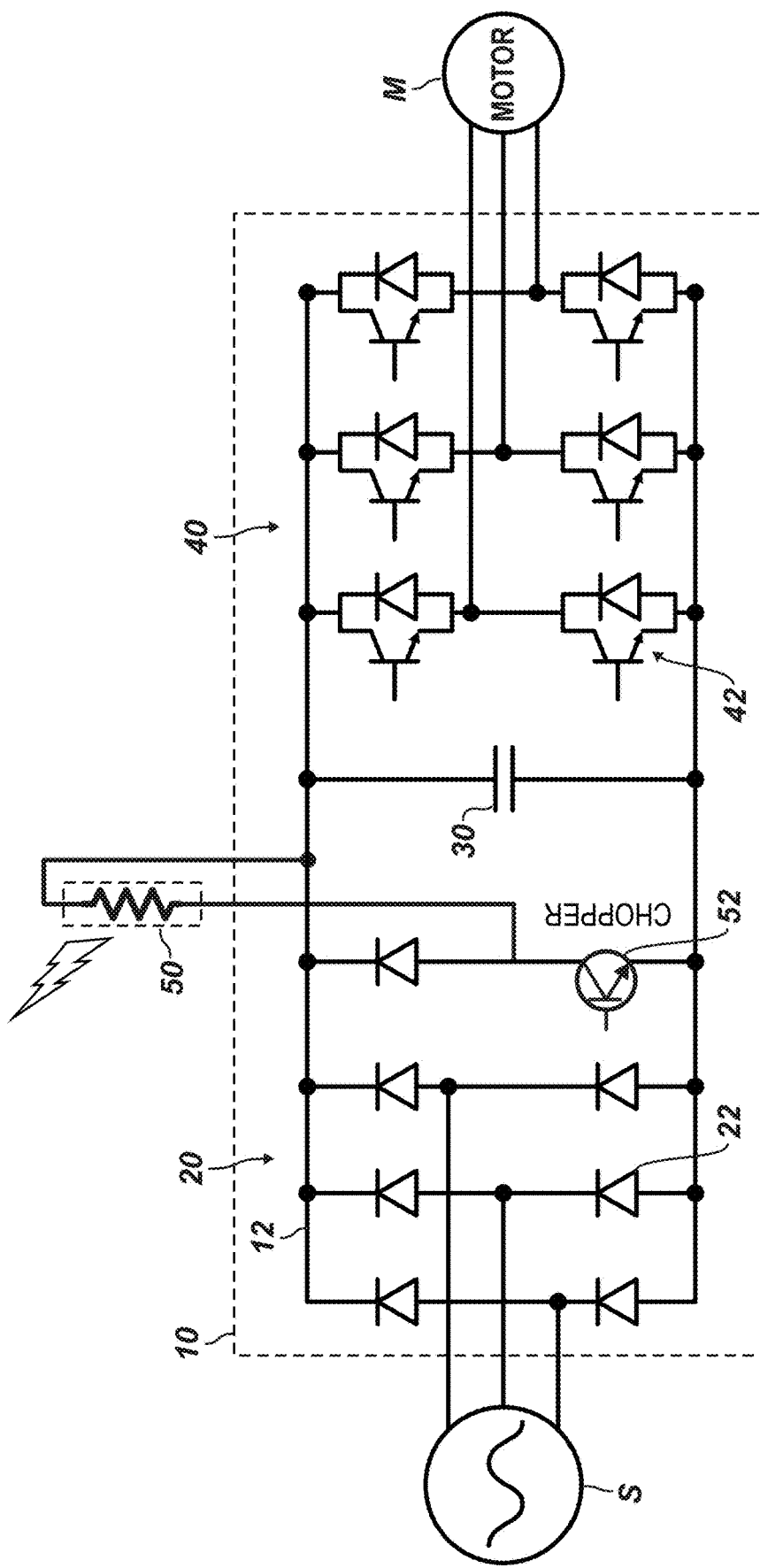
FIG. 1A schematically illustrates a variable-frequency drive having a dynamic braking resistor and being connected between a utility AC power source and an electric motor for a reciprocating pump unit.
Figure 1B:
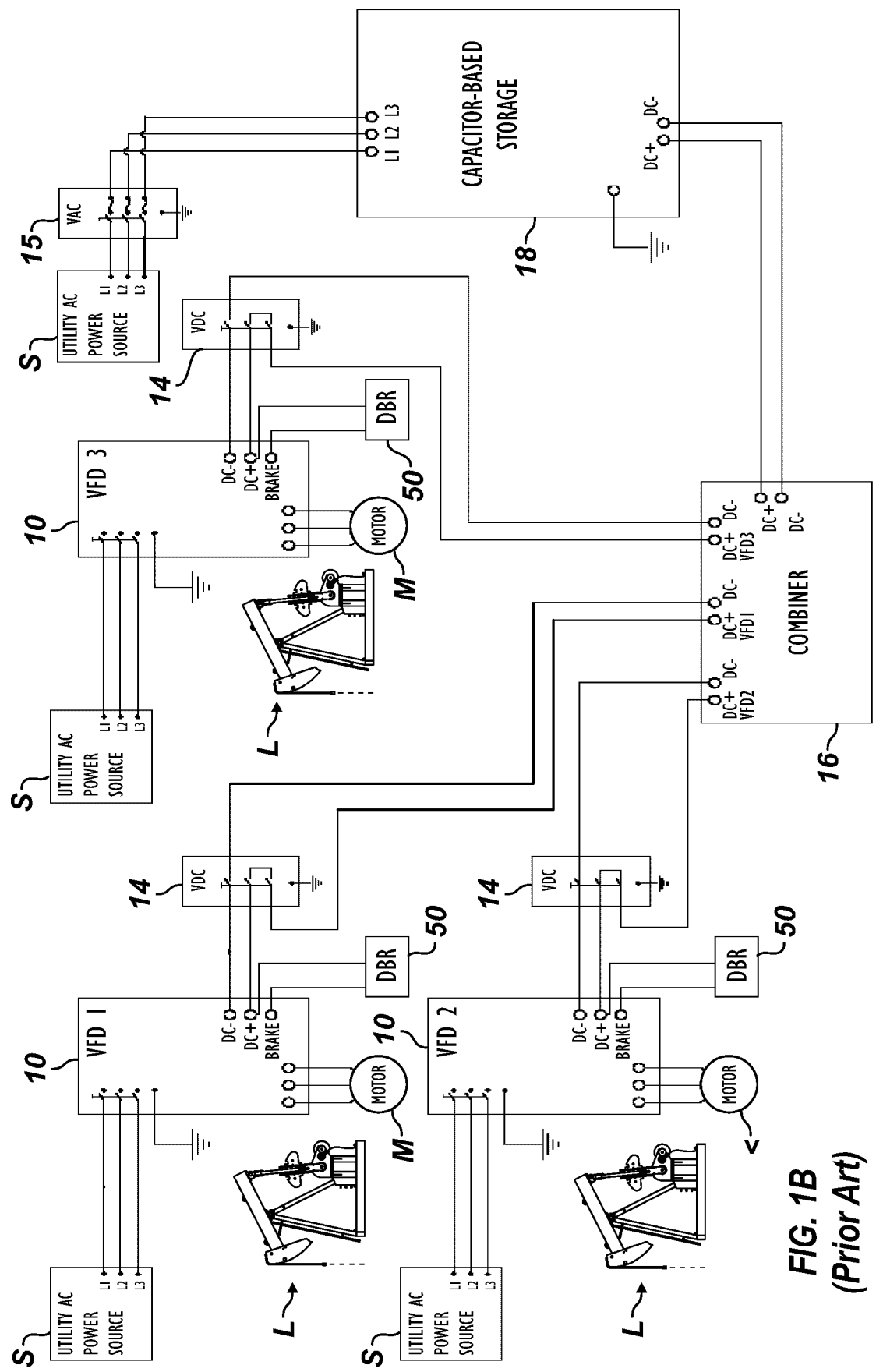
FIG. 1B illustrates an installation of reciprocating pump units having an on-site storage system according to the prior art.
Figure 2:
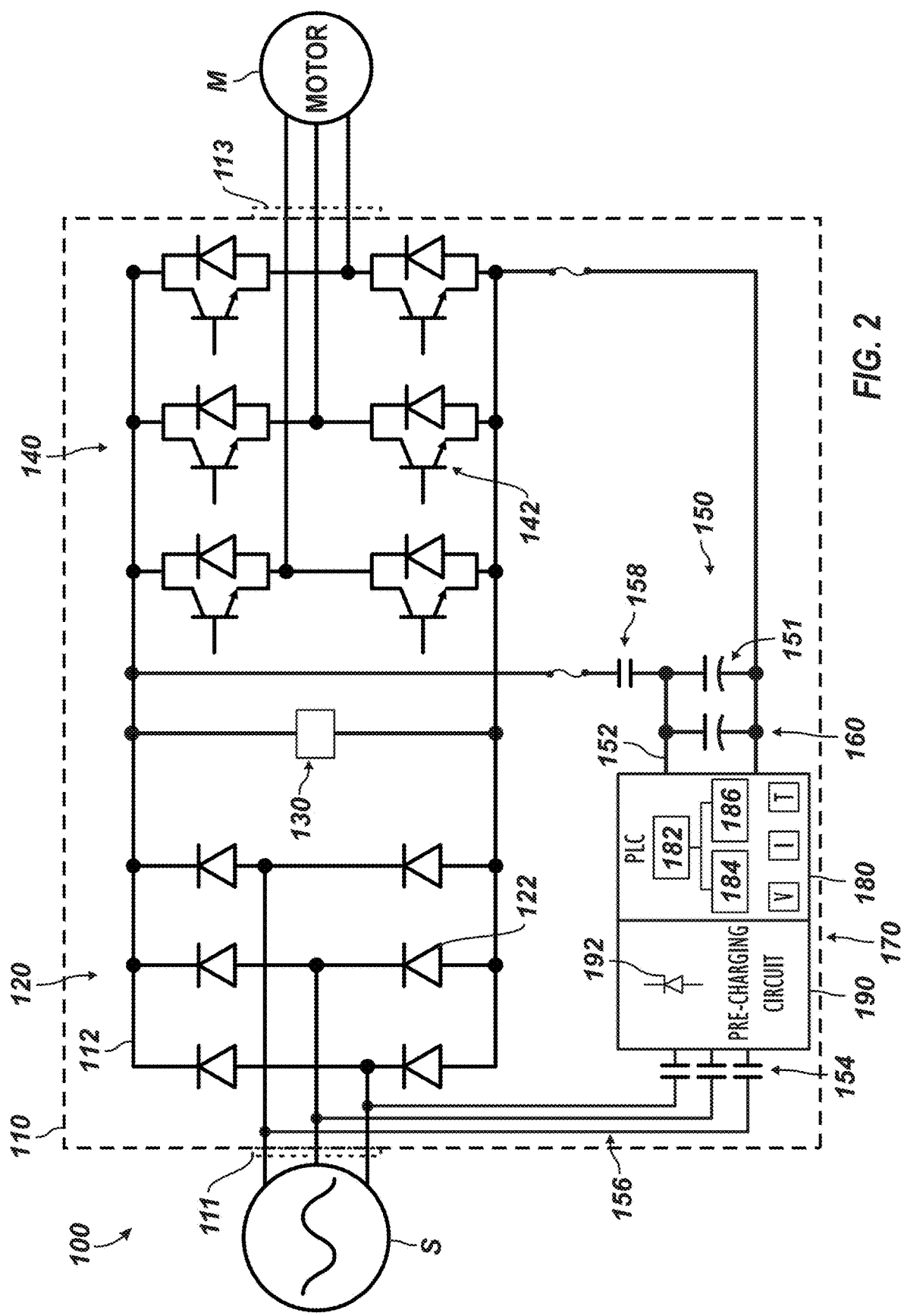
FIG. 2 schematically illustrates an integrated apparatus having a variable-frequency drive with associated storage and being connected between a utility AC power source and an electric motor for a reciprocating pump unit.

FIG. 2 schematically illustrates an integrated apparatus 100 having a variable-frequency drive 110 connected between a utility AC power source (S) and an electric motor (M) for a load (not shown). The variable-frequency drive 110 is configured to condition input electrical power from the AC power source (S) and to deliver power to the electric motor (M) of the load, which can be a device that undergoes reciprocating motion, such as a reciprocating load device like a reciprocating pump unit, a pump jack, a rod pumping unit, etc. Aspects of the present disclosure have particular applicability to loads that produce regenerative energy in the electric motor (M) during operation.

As shown in FIG. 2, the variable-frequency drive 110 is a three-phase variable-frequency drive. The variable-frequency drive 110 has an input 111 configured to connect to the utility AC power source (S) and has an output 113 configured to connect to the electric motor (M). The variable-frequency drive 110 includes a DC line or DC bus 112, a rectifier stage 120, a DC bus filter 130, an inverter stage 140, and a capacitor-based storage 150.

Briefly, the rectifier stage 120 is connected to the input 111 and is configured to convert AC power from the AC power source (S) to DC power on the DC bus 112. The DC bus filter 130 is connected between the DC bus 112 and is configured to filter the DC power of the DC bus 112. The inverter stage 140 is connected to the DC bus 112 and is configured to convert the DC power to three-phase AC power for the output 113 to the electric motor (M).

The capacitor-based storage 150 has a DC capacitor bank 151 having one or more DC capacitors 160, which can be connected to the DC bus 112. During operation, the bank 151 of DC capacitors 160 can store regenerative power passed from the electric motor (M) back through the inverter stage 140 to the DC bus 112. In turn, the DC capacitor bank 151 can supply the stored DC power to the DC bus 112 for conversion to the three-phase AC power to drive the electric motor (M).

The control circuitry 170 is configured to pre-charge the one or more DC capacitors 160 of the DC capacitor bank 151 from the AC power of the AC power source (S). For example, the control circuitry 170 has a pre-charging circuit 190 connected between the input 111 and the bank 151 of DC capacitors 160. The control circuitry 170 is further configured to monitor one or more parameters of the variable-frequency drive 110 and is configured to detect one or more fault conditions associated with the one or more monitored parameters.

Looking in more detail, the rectifier stage 120 has input receivers (i.e., diodes 122) that convert the incoming three-phase AC power from the source (S) to DC power on the DC bus 112. The rectifier stage 120 allows energy to flow into the inverter stage 140, but not back to the utility power source (S). The rectifier stage 120 is configured to receive 3-phase electrical power at the input 111 along three respective lines (also referred to herein as line voltage) from any suitable power source (S), which can be provided as an electrical power grid. The input line voltage can be a typical 480 volt (V) three phase input, such as when the power source (S) is defined by the electrical power grid.

In the present example, the rectifier stage 120 include a plurality of diodes 122 arranged as pairs of diodes connected in parallel with each other between the positive and negative lines of the DC bus 112. The diodes 122 of each pair of diodes are connected in series with each other between the positive and negative lines of the DC bus 112. The diodes 122 of each pair of diodes are forward biased in the same direction from the positive line to the negative line. Here, to do the AC to DC conversion, the rectifier stage 120 includes three pairs of diodes 122 with each of the pairs connected in parallel. The diodes 122 of each of the pairs are forward biased in the same direction. Each of the pairs is connected to a respective one of the phases of the 3-phase input. In this way, the diodes 122 are arranged as a diode bridge that rectifies the voltage received from the AC power source (S) and outputs a single-phase DC bus voltage to the DC bus 112.

The DC bus filter 130 smooths the DC power on the DC bus 112. The DC bus filter 130 can use an inductor, a capacitor, or a combination of these to smooth out the rectified DC power. As a capacitor, the DC bus filter 130 can have a capacitance related to a peak current to be supplied to the electric motor (M) of the load. In one example, the capacitance can be in a range from approximately 10,000 microfarad (mfd) to approximately 30,000 mfd.

The inverter stage 140 converts the DC power into a variable-frequency AC voltage that controls the speed of the electric motor (M). As shown, the inverter stage 140 can include a plurality of inverters 142 arranged as pairs connected in parallel with each other. The inverters 142 of each pair are connected in series with each other. Each of the pairs of inverters 142 is electrically connected along a separate line for the output 113 to the electric motor (M). The inverters 142 of the inverter stage 140 can use pulse width modulation (PWM) to actively switch the DC bus voltage to the electric motor (M) on-and-off. This produces an AC current to the motor (M).

As noted, overhauling or decelerating loads on the electric motor (M) can make the electric motor (M) turn faster than the synchronous speed set by the variable-frequency drive 110. When this happens, the electric motor (M) acts as a generator in which mechanical energy from the electric motor (M) is converted into regenerative power. This regenerative power flows back into the variable-frequency drive 110. Current is able to flow back across the inverters 142 of the inverter stage 140 to the DC bus 112, but the current is stopped from passing back to the source (S) by the rectifier stage 120. This increases the voltage level of the DC bus 112. To prevent overvoltage of the DC bus 112 and in contrast to prior art techniques, the regenerative power is handled without using a dynamic braking resistor to dissipate the regenerative power as heat.

In particular, the electric motor (M) draws/consumes the power from the utility power source (S) during the up-stroke operation of the reciprocating pump unit, but the electric motor (M) generates regenerative power during the down-stroke operation of the reciprocating pump unit. As noted previously, the use of a dynamic braking resistor is a common way to burn off the regenerative power to prevent a fault condition. However, this integrated apparatus 100 eliminates the dynamic braking resistor needed to manage the regenerative power produced during the down stroke operation of the reciprocating pump unit. Instead, the integrated apparatus 100 of FIG. 2 includes a capacitor-based storage 150 directly associated with the variable-frequency drive 110.

As briefly noted above, the capacitor-based storage 150 includes the bank 151 of one or more DC capacitors 160. The capacitor-based storage 150 also includes the control circuitry 170, which has a controller 180 and a pre-charging circuit 190. The controller 180 can be a programmable logic controller (PLC) or other type of control unit. In general, the controller 180 can be defined by one or more components, including a processing unit 182, a memory 184, and sensors 186. The processing unit 182 of the controller 180 can use any suitable processor and can operate using program instructions stored in the memory 184, which can be volatile or non-volatile memory. The sensors 186 can include circuitry configured to measure a voltage level, a current level, and a temperature level associated with the variable-frequency drive 110.

As an example, the storage's DC capacitors 160 can use nickel oxide hydroxide high amperage capacitors, although any other type of capacitor can be used. The DC capacitors 160 are connected across a DC bus 152 of the bank 151, which is connected to the DC bus 112 of the variable-frequency drive 110.

As shown, the positive line of the DC bus 152 for the DC capacitors 160 can connect to the positive line of the DC bus 112 using an operating contact 158 and a fuse, and the positive line of the DC bus 152 for the DC capacitors 160 can connect to the negative line of the DC bus 112 using a fuse. The operating contact 158 can be a contactor, switch, relay, or the like, which can be controlled by the controller 180. The operating contact 158 is configured to selectively connect between (a) an opened state in which the DC capacitor bank 151 is electrically disconnected from the DC bus 112, and (b) a closed state in which the DC capacitor bank 151 is electrically connected to the DC bus 112.

The controller 180 controls pre-charging of the DC capacitors 160; checks initial voltage levels on the storage's DC bus 152 to start operations; and monitors voltage, current, temperature, and the like of the variable-frequency drive 110 to detect possible fault conditions.

The pre-charging circuit 190 is controlled by the controller 180 and can selectively connect the energy storage's DC capacitors 160 to the three-phase input AC power of the variable-frequency drive 110 provided by the power source (S). As shown, the pre-charging circuit 190 can be electrically connected by lines 156 to the input 111 of the variable-frequency drive 110 to obtain AC power from the AC power source (S). This can simplify the hookup and connection of the variable-frequency drive 110 to the power grid and can simply the drive's enclosure and other features. However, the pre-charging circuit 190 can have its own hookup and connection to the power grid.

Either way, charging contacts 154 can be used on the lines 156 connected to the three-phase input AC power of the power source (S). Again, in this example, the lines 156 can connect to the input 111 of the variable-frequency drive 110, but they could connect to a separate power grid hookup. The charging contacts 154 can be contactors, switches, relays, or the like, which can be controlled by the controller 180. The charging contacts 154 are configured to selectively connect between (a) an opened state in which the pre-charging circuit 190 is electrically disconnected from the input 111, and (b) a closed state in which the pre-charging circuit 190 is electrically connected to the input 111.

For pre-charging, the charging contacts 154 are selectively closed, and the operating contact 158 is selectively opened. The controller 180 can be configured to control the charging contacts 154 and the operating contact 158 to switch the capacitor-based storage 150 between a pre-charging mode and an operating mode.

In the pre-charging mode, the pre-charging circuit 190 converts the three-phase input AC power to DC power to charge the DC capacitors 160. For example, the pre-charging circuit 190 can include an AC-to-DC converter configured as a plurality of diodes 192 arranged in diode bridges connected in parallel with each other between the positive and negative lines of the storage's DC bus 152. Each of the diode bridges receive a voltage input from a respective one of the phases of input line voltage from lines 156. Thus, the converter of the pre-charging circuit 190 is configured to receive a 3-phase electrical input line voltage from the input 111, to rectify the AC line voltage, and to output a single-phase DC bus voltage to the storage's DC bus 152.

The DC capacitors 160 on the storage's DC bus 152 are connected in parallel with the pre-charging circuit 190 between the positive and negative lines of the storage's DC bus 152. The DC capacitors 160 are configured to receive and store the single-phase DC bus voltage output during pre-charging from the pre-charging circuit 190.

The DC capacitors 160 of the DC capacitor bank 151 can have a suitable capacitance. In general, the capacitance of the DC capacitors 160 is designed to receive, store, and deliver sufficient regenerative energy with the variable-frequency drive 110. In one example, the DC capacitors 160 can include one or more supercapacitors with a capacitance in a range from approximately 1 Farad (F) to approximately 50 F.

After the energy storage's DC capacitors 160 have reached a target voltage level measured by the voltage (V) sensor 186, the pre-charging circuit 190 discontinues the pre-charging. The controller 180 selectively opens the charging contacts 154 and closes the operating contact 158 to enter operating mode. In the operating mode, the cathode of the capacitor-based storage 150 is electrically connected to the positive side of the drive's inverters 142 through the closed operating contact 158. The voltages on the drive's DC bus 112 and the storage's DC bus 152 are connected during normal operation so power can be conducted between the drive's DC bus 112 and the storage's DC bus 152.

During operation, the electric motor (M) draws/consumes the power from the utility power source (S) and from the associated capacitor-based storage 150 during the up-stroke operation of the reciprocating load (e.g., reciprocating pump unit). As the electric motor (M) generates regenerative power during the down-stroke operation of the reciprocating pump unit, the one or more DC capacitors 160 of the associated capacitor-based storage 150 store the regenerative power for later use. The control circuitry 170 (e.g., the controller 180) can manage the power flow if necessary. However, the arrangement of the circuitry for the capacitor-based storage 150 and the variable-frequency drive 110 inherently allows for the energy to flow as needed so that the control circuitry 170 does not need to directly manage the power flow.

The bank 151 of DC capacitors 160 enhance the performance of the reciprocating pump unit by increasing the operating efficiency of the variable-frequency drive 110 and by eliminating the need for having the dynamic braking resistor on the variable-frequency drive 110. The reliability of the variable-frequency drive 110 increases significantly due to the elimination of the dynamic braking resistor. The operating efficiency of the variable-frequency drive 110 also increases due to the reuse of the regenerative energy.

As noted above, the controller 180 can be configured to monitor one or more parameters of the variable-frequency drive 110 and can be configured to detect one or more fault conditions associated with the one or more monitored parameters. For example, the controller 180 can include a voltage (V) sensor 186 having circuitry configured measure a voltage level associated with the storage's DC bus 152. Therefore, in the operating mode, the voltage (V) sensor 186 can measure the voltage level of the drive's DC bus 112 (connected to the storage's DC bus 152). The controller 180 can then detect a voltage fault based on the measured voltage level as one of the one or more fault conditions. In the pre-charging mode, the voltage (V) sensor 186 can measure the voltage level measured of the storage's DC bus 152 (disconnected from the drive's DC bus 112). The controller 180 can then detect pre-charging of the DC capacitor bank 151 to a predefined voltage threshold.

In another example, the controller 180 can include a current (I) sensor 186 having circuitry configured measure a current level associated with the storage's DC bus 152. Therefore, in the operating mode, the current (I) sensor 186 can measure a current level of the drive's DC bus 112 (connected to the storage's DC bus 152), and the controller 180 can detect a current fault based on the measured current level. The current (I) sensor 186 can also measure a current level of the capacitor-based storage 150 during the pre-charging mode.

In yet another example, the controller 180 can include a temperature (T) sensor 186 having circuitry configured to measure a temperature level associated with the DC capacitor bank 151. Therefore, in the operating mode, the temperature (T) sensor 186 can measure the temperature level of the DC capacitor bank 151, and the controller 180 can detect a temperature fault based on the measured temperature level. Temperature levels can be measured with respect to other parts of the variable-frequency drive 110 as well. Moreover, temperature levels can be measured during the pre-charging mode.

Figure 3:
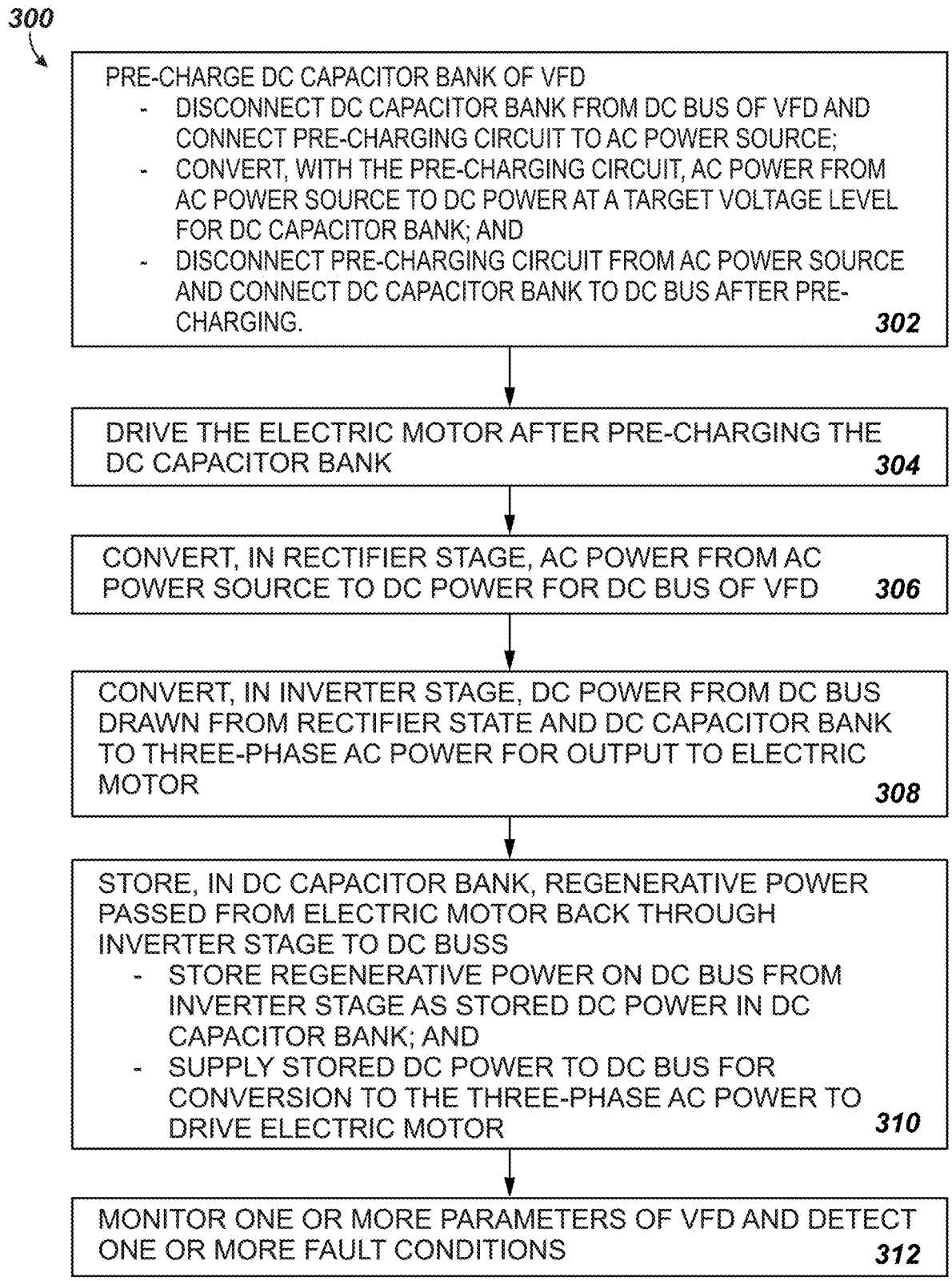
FIG. 3 illustrates an installation of reciprocating pump units each having an integrated apparatus according to the present disclosure.

FIG. 3 is a flowchart of a process 300 used with a variable-frequency drive 110 of the present disclosure. Reference to elements in FIG. 2 are provided for better understanding. As noted, the variable-frequency drive 110 is connected to an alternating (AC) power source (S) and is configured to drive an electric motor (M). In some implementations, one or more process blocks of FIG. 3 may be performed by the variable-frequency drive 110, the control circuitry 170, and other elements shown in FIG. 2.

As shown in FIG. 3, the process 300 starts in a pre-charging mode by pre-charging the DC capacitors 160 of the variable-frequency drive 110 (Block 302). For example, the pre-charging circuit 190 may pre-charge the DC capacitors 160. To do this, the controller 180 of the control circuitry 170 disconnects the DC capacitors 160 from the DC bus 112 of the variable-frequency drive 110 by opening (or keeping open) the operating contact 158. The controller 180 also connects the pre-charging circuit 190 to the AC power source (S) by closing the charging contacts 154. The pre-charging circuit 190 converts AC power from the AC power source (S) to the DC power at a target voltage level for the DC capacitors 160. The voltage (V) sensor 186 of the controller 180 can monitor the voltage levels. After pre-charging to the target voltage level, the controller 180 then disconnects the pre-charging circuit 190 from the AC power source (S) by opening the charging contacts 154 and sets up the variable frequency drive 110 for operation by closing the operating contact 158 and connecting the DC capacitors 160 to the DC bus 112.

After pre-charging the DC capacitors 160, the process 300 can switch to an operating mode to drive the electric motor (Block 404). The rectifier stage 120 of the variable frequency drive 110 converts the AC power from the AC power source (S) to DC power for the DC bus 112 (Block 306). The inverter stage 140 converts the DC power on the DC bus 112 drawn from the rectifier stage 120 and from the DC capacitors 160 to three-phase AC power for output to the electric motor (M) (Block 308). Thus, the electric motor (M) consumes/draws the power at the inverter stage 140 available from the DC bus 112, which comes from the rectifier stage 120 and/or the capacitor-based storage 150, as the case may be.

When the electric motor (M) acts as a generator during operation, the process 300 then stores, in the DC capacitors 160, regenerative power passed from the electric motor (M) back through the inverter stage 140 to the DC bus 112 (Block 310). For example, the regenerative power on the DC bus 112 passed from the inverter stage 140 is stored on the DC capacitors 160 as stored DC power. Then, based on operational needs, the stored DC power on the DC capacitors 160 can be supplied to the DC bus 112 for conversion by the inverter stage 140 to the three-phase AC power to drive the electric motor (M).

Finally, in the process 300, the control circuitry 170 can monitor one or more parameters of the variable-frequency drive 110 and can detect one or more fault conditions associated with the one or more parameters. As noted, the parameters to be monitored can be voltage level, current level, and temperature level. Other parameters can be monitored as needed. The monitoring of the parameters can be performed during one or both of the pre-charging mode and the operating mode.

Although FIG. 3 shows example blocks of the process 300, in some implementations, the process 300 may include additional blocks, fewer blocks, different blocks, or differently arranged blocks than those depicted in FIG. 3. Additionally, or alternatively, two or more of the blocks of the process 300 may be performed in parallel.

FIG. 4 illustrates an installation of reciprocating load devices (L) (e.g., reciprocating pump units) each having an integrated apparatus 100 according to the present disclosure. Three reciprocating pump units (L) are shown, each having a variable-frequency drive 110 for an electric motor (M). The variable-frequency drives 110 connect to the utility AC power source (S) and power the connected electric motor (M).

Each of the variable-frequency drives 110 lacks a dynamic braking resistor. Instead, the DC terminals for each variable-frequency drive 110 connects to the DC terminals of an associated capacitor-based storage 150. Accordingly, each of the variable-frequency drives 110 has its own associated capacitor-based storage 150 and does not share regenerative power with the drives 110 of other reciprocating pump units. Consequently, a fault of one variable-frequency drive 110 does not affect the variable-frequency drives 110.

The associated capacitor-based storage 150 can be integrated within the same enclosure of the variable-frequency drive 110 or can be integrated as an add-on enclosure bolted on the side of the variable-frequency drive 110 to manage the regenerative energy created during the downstroke operation of the reciprocating pump unit. In either case, the capacitor-based storage 150 also connects to the utility AC power source of the variable-frequency drive 110. In one example, the associated capacitor-based storage 150 can be designed for a 3-phase 480V/60 Hz environment and can be used with diode front-end 6-pulse variable-frequency drives offering 65 HP to 150 HP.

Programming of the controller (180) of the storage 150 can be accessible from outside the variable-frequency drive 110 and the enclosure. The controller (180) can be MOD-BUS enabled for automation. In general, the associated capacitor-based storage 150 is self-contained, and no user interface is required.

Figure 5:
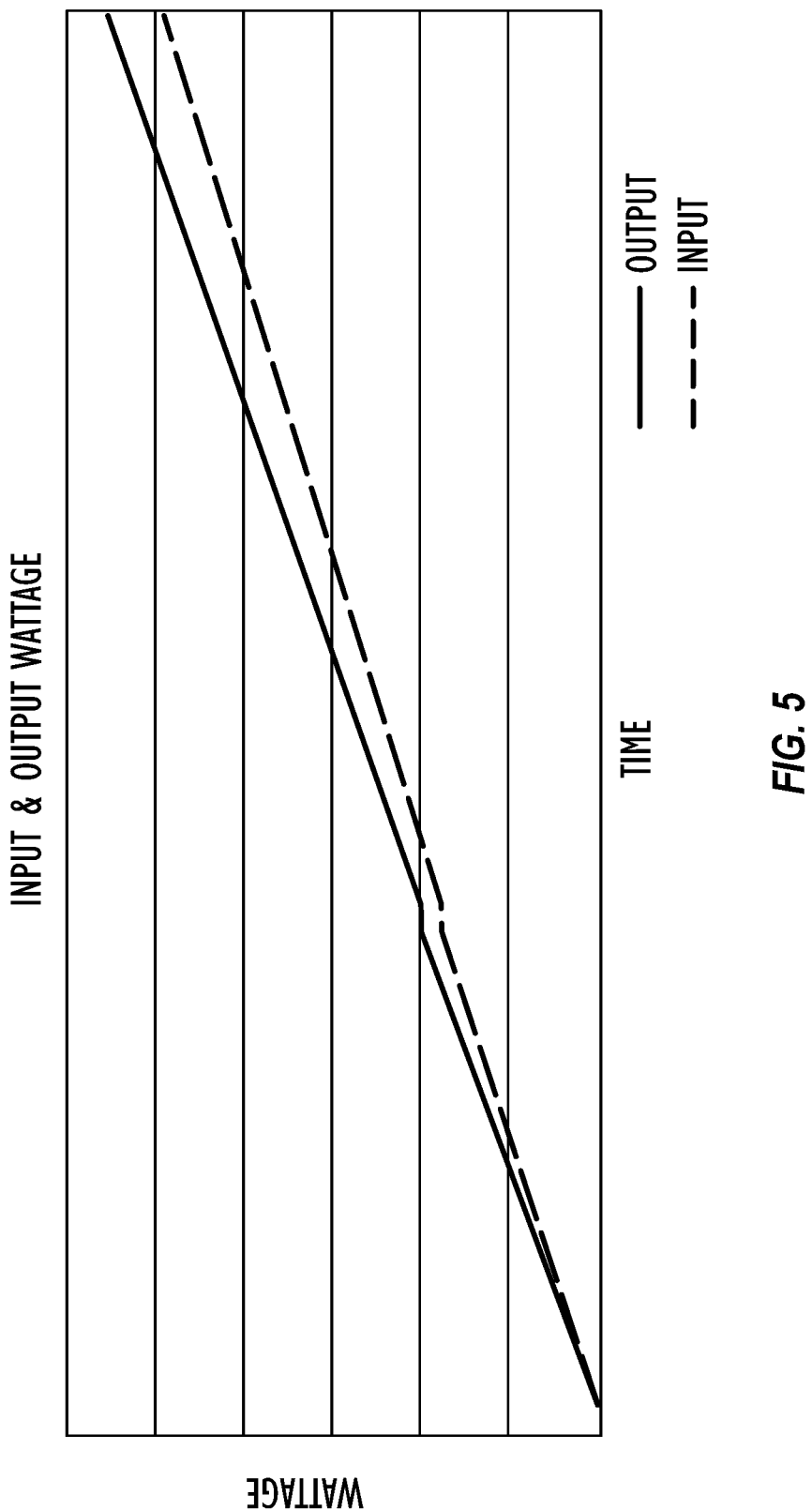
FIG. 5 illustrates a graph that evaluates performance of the integrated apparatus of the present disclosure when used on reciprocating pump units having variable-frequency drives with associated capacitor-based storage and lacking a dynamic braking resistor and a chopper circuit.

FIG. 5 illustrates a graph 500 that evaluates performance of the integrated apparatus 100 of the present disclosure when used on reciprocating pump units having variable-frequency drives 110 with associated capacitor-based storage 150 and lacking a dynamic braking resistor and a chopper circuit. Input and output wattages are shown for an installation having multiple reciprocating pumping units operated using electric motors (M). Each electric motor (M) of the reciprocating pumping units is operated by one of the disclosed integrated apparatus 100.

The input wattage measured for the installation is shown increasing linearly over time during operation. The variable-frequency drives 110 may have an internal loss associated with their efficiency, such as an internal loss of 2%. Even with this internal loss, the output wattage produced for the installation shows an increased trend over the input wattage. Therefore, the integrated apparatus 100 of the present disclosure can increase the efficiency by producing more output wattage per unit of input wattage by recycling the regenerative energy of the associated drive 110. It is believed that in some installations, the efficiency can provide about 16% in wattage saving assuming the variable frequency drives have an internal loss of 2%. In the end, the energy efficiency of the integrated apparatus 100 reduces the operating costs and reduces the environmental impact of the installation.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A variable-frequency drive for use with an alternating current (AC) power source and an electric motor of a reciprocating load device, the variable-frequency drive comprising:
   an input being configured to connect to the AC power source;
   an output being configured to connect to the electric motor;
   a rectifier stage connected to the input and being configured to convert AC power from the AC power source to direct current (DC) power on a DC bus;
   a DC bus filter connected between the DC bus and being configured to filter the DC power of the DC bus;
   an inverter stage connected to the DC bus and being configured to convert the DC power to three-phase AC power for the output to the electric motor;
   a DC capacitor bank having one or more capacitors connected to the DC bus, the DC capacitor bank being configured to store regenerative power on the DC bus from the inverter stage as stored DC power, the DC capacitor bank being configured to supply the stored DC power to the DC bus for conversion to the three-phase AC power to drive the electric motor; and control circuitry being configured to pre-charge the one or more capacitors of the DC capacitor bank from the AC power of the AC power source, the control circuitry being configured to monitor one or more parameters of the variable-frequency drive and being configured to detect one or more fault conditions associated with the one or more parameters.

2. The variable-frequency drive of claim 1, wherein the three-phase AC power to drive the electric motor is drawn from both the DC capacitor bank and from the AC power source.

3. The variable-frequency drive of claim 1, wherein the control circuitry comprises a pre-charging circuit being selectively connectable to the AC power of the AC power source, the pre-charging circuit having diode pairs configured to convert the AC power from the AC power source to the DC power for the DC capacitor bank.

4. The variable-frequency drive of claim 3, wherein the pre-charging circuit comprises a converter receiving a three-phase line voltage and converting the three-phase line voltage to a single-phase DC voltage that charges the DC capacitor bank.

5. The variable-frequency drive of claim 3,
wherein the control circuitry comprises:
charging contacts selectively connected between the AC power at the input and the pre-charging circuit, and
an operating contact selectively connected between a positive line of the DC capacitor bank and the DC bus; and
wherein the control circuitry is operable in a pre-charging mode to selectively close the charging contacts and open the operating contact and is operable in an operating mode to selectively open the charging contacts and close the operating contact.

6. The variable-frequency drive of claim 5, wherein the pre-charging circuit connects to the input of the variable-frequency drive having the AC power of the AC power source; and wherein the charging contacts are configured to selectively connect between (a) an opened state in which the pre-charging circuit is electrically disconnected from the input, and (b) a closed state in which the pre-charging circuit is electrically connected to the input.

7. The variable-frequency drive of claim 5, wherein the operating contact is configured to selectively connect between (a) an opened state in which the DC capacitor bank is electrically disconnected from the DC bus, and (b) a closed state in which the DC capacitor bank is electrically connected to the DC bus.

8. The variable-frequency drive of claim 5, wherein the control circuitry comprises a voltage sensor being configured measure a voltage level associated with the DC capacitor bank.

9. The variable-frequency drive of claim 8, wherein the control circuitry in the operating mode is configured to monitor the voltage level measured by the voltage sensor of the DC bus as one of the one or more parameters of the variable-frequency drive, the control circuitry being configured to detect a voltage fault based on the voltage level as one of the one or more fault conditions.

10. The variable-frequency drive of claim 8, wherein the control circuitry in the pre-charging mode is configured to monitor the voltage level measured by the voltage sensor of the DC capacitor bank, the control circuitry being configured to detect pre-charging of the DC capacitor bank to a predefined voltage threshold.

11. The variable-frequency drive of claim 5, wherein the control circuitry comprises a current sensor being configured measure a current level associated with the DC capacitor bank; and wherein the control circuitry in the operating mode is configured to monitor the current level measured by the current sensor of the DC bus as one of the one or more parameters of the variable-frequency drive, the control circuitry being configured to detect a current fault based on the current level as one of the one or more fault conditions.

12. The variable-frequency drive of claim 5, wherein the control circuitry comprises a temperature sensor being configured measure a temperature level associated with the DC capacitor bank; and wherein the control circuitry in the operating mode is configured to monitor the temperature level measured by the temperature sensor as one of the one or more parameters of the variable-frequency drive, the control circuitry being configured to detect a temperature fault based on the temperature level as one of the one or more fault conditions.

13. The variable-frequency drive of claim 1, wherein the control circuitry comprises a voltage sensor being configured measure a voltage level associated with the DC capacitor bank; and wherein the control circuitry is configured to monitor the voltage level measured by the voltage sensor and is configured to detect a voltage fault based on the voltage level as one of the one or more fault conditions.

14. The variable-frequency drive of claim 1, wherein the control circuitry comprises a current sensor being configured measure a current level associated with the DC capacitor bank; and wherein the control circuitry is configured to monitor the current level measured by the current sensor and is configured to detect a current fault based on the current level as one of the one or more fault conditions.

15. The variable-frequency drive of claim 1, wherein the control circuitry comprises a temperature sensor being configured measure a temperature level associated with the DC capacitor bank; and wherein the control circuitry is configured to monitor the temperature level measured by the temperature sensor and is configured to detect a temperature fault based on the temperature level as one of the one or more fault conditions.

16. The variable-frequency drive of claim 1, wherein the DC bus lacks a chopper circuit and a dynamic braking resistor.

17. A reciprocating pump unit used with an alternating current (AC) power source, the reciprocating pump unit comprising:
an electric motor; and
a variable-frequency drive according to claim 1.

18. A method used with a variable-frequency drive, the variable-frequency drive connected to an alternating (AC) power source and configured to drive an electric motor, the method comprising:
pre-charging a direct current (DC) capacitor bank of the variable-frequency drive; and
driving the electric motor after pre-charging the DC capacitor bank by:
converting, in a rectifier stage, AC power from the AC power source to DC power for a DC bus of the variable-frequency drive;
converting, in an inverter stage, the DC power on the DC bus drawn from the rectifier stage and the DC capacitor bank to three-phase AC power for output to the electric motor; and
storing, in the DC capacitor bank, regenerative power passed from the electric motor back through the inverter stage to the DC bus.

19. The method of claim 18, wherein pre-charging the DC capacitor bank comprises:
   disconnecting the DC capacitor bank from the DC bus of the variable-frequency drive and connecting a pre-charging circuit to the AC power source;
   converting, with the pre-charging circuit, AC power from the AC power source to the DC power at a target voltage level for the DC capacitor bank; and
   disconnecting the pre-charging circuit from the AC power source and connecting the DC capacitor bank to the DC bus after pre-charging the DC capacitor bank to the target voltage level.

20. The method of claim 18, wherein storing, in the DC capacitor bank, the regenerative power comprises:
   storing the regenerative power on the DC bus from the inverter stage as stored DC power in the DC capacitor bank; and
   supplying the stored DC power to the DC bus for conversion to the three-phase AC power to drive the electric motor.

21. The method of claim 18, further comprising:
   monitoring one or more parameters of the variable-frequency drive; and
   detecting one or more fault conditions associated with the one or more parameters being monitored.

22. The method of claim 21, wherein pre-charging the DC capacitor bank of the variable-frequency drive comprises:
   measuring one or more of a voltage level, a current level, and a temperature level associated with the DC capacitor bank as the one or more parameters; and
   detecting, based on the measurement, one or more of a voltage fault, a current fault, and a temperature fault as the one or more fault conditions.

23. The method of claim 21, wherein driving the electric motor comprises:
   measuring one or more of a voltage level, a current level, and a temperature level associated with the DC bus as the one or more parameters; and
   detecting, based on the measurement, one or more of a voltage fault, a current fault, and a temperature fault as the one or more fault conditions.

* * * * *